Nov. 23, 1954 C. A. GOOLEY ET AL 2,694,890
SPRING TOOTHED HARROW
Original Filed Aug. 2, 1945 3 Sheets-Sheet 1
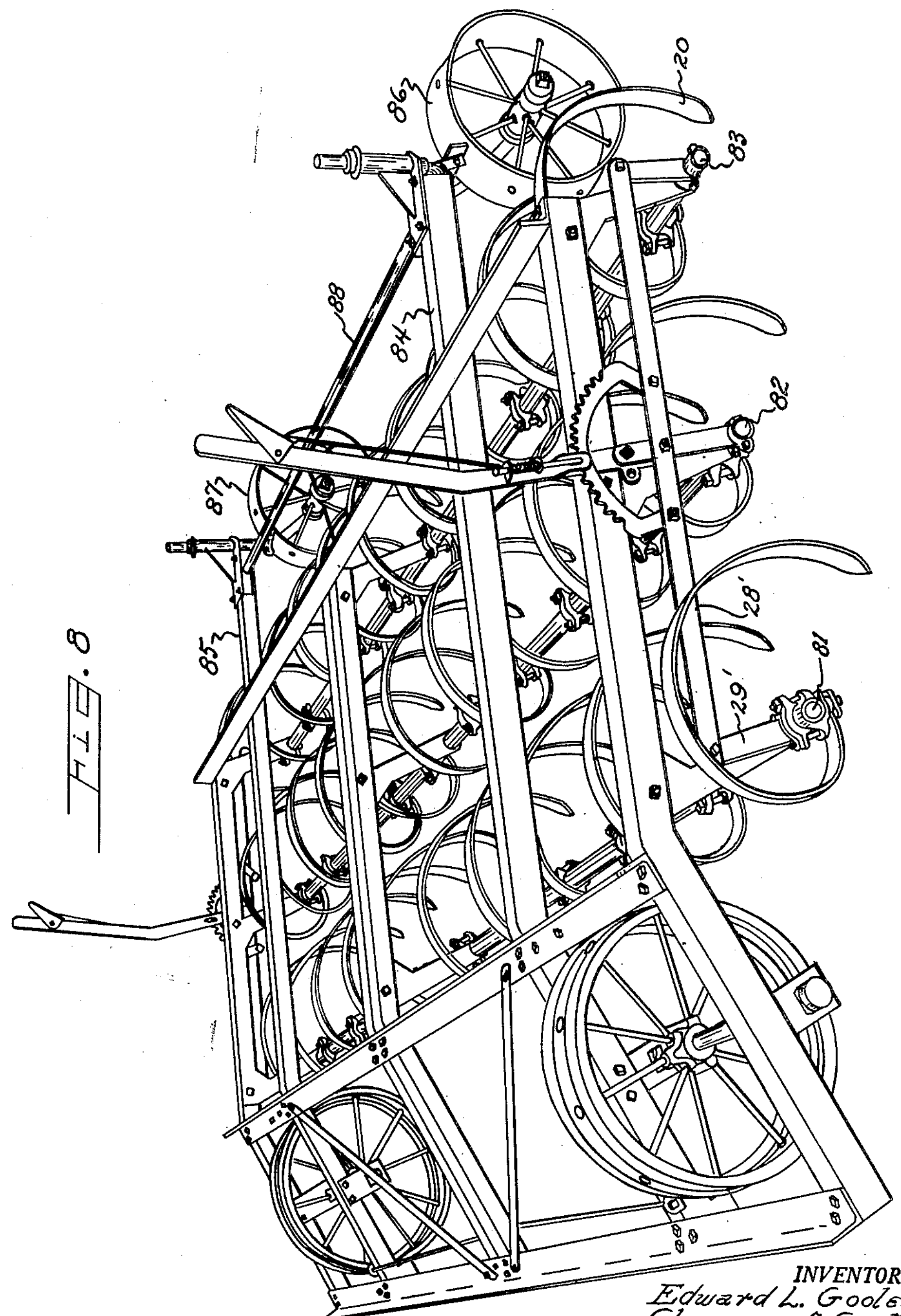
INVENTOR.
Edward L. Gooley
Clarence A. Gooley
BY Greek Wells
Atty.

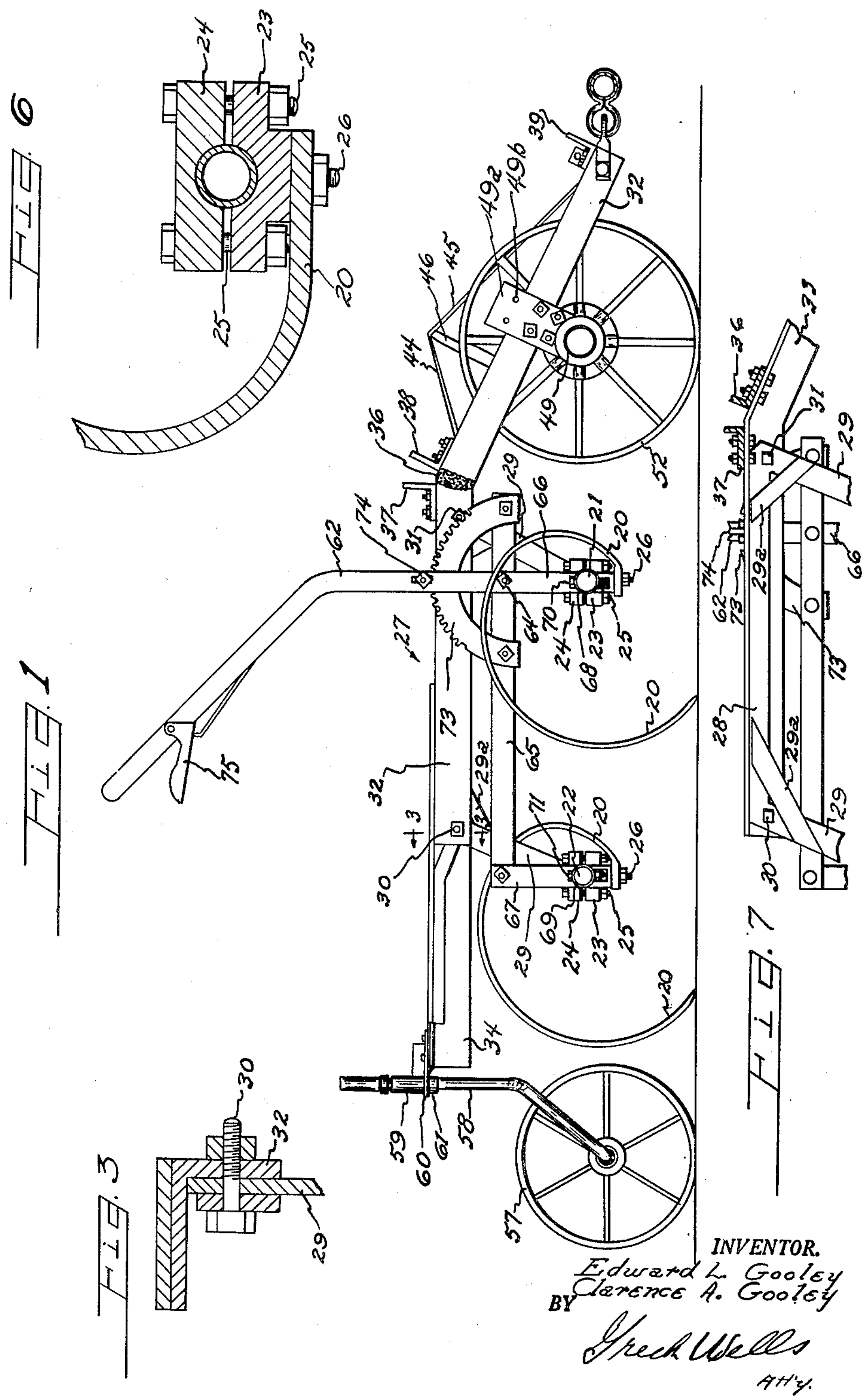
INVENTOR.
Edward L. Gooley
Clarence A. Gooley
BY
Att'y.

Nov. 23, 1954 C. A. GOOLEY ET AL 2,694,890
SPRING TOOTHED HARROW
Original Filed Aug. 2, 1945 3 Sheets-Sheet 3
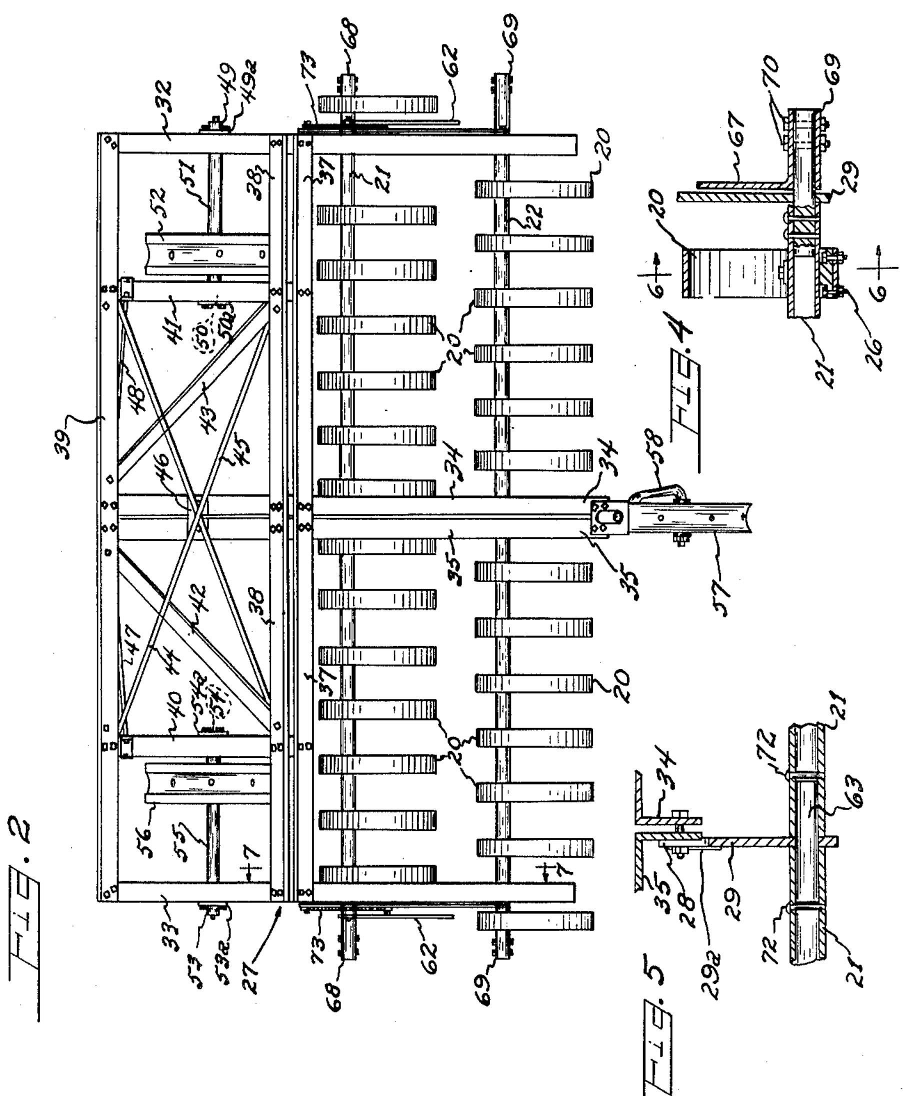
INVENTOR.
Edward L. Gooley
Clarence A. Gooley
BY
Frank Wells
Att'y.

United States Patent Office 2,694,890

Patented Nov. 23, 1954

1

2,694,890

SPRING TOOTHED HARROW

Clarence A. Gooley and Edward L. Gooley, Harrington, Wash.

Original application August 2, 1945, Serial No. 608,411. Divided and this application September 18, 1950, Serial No. 185,344

4 Claims. (Cl. 55—92)

Our invention relates to improvements in a spring toothed harrow.

This application is a division of our application Serial No. 608,411, filed August 2, 1945, for Spring Tooth Harrow, now Patent No. 2,591,147. It is the principal purpose of the invention to provide a wheel supported spring tooth harrow that can be controlled adequately as to depth and is not subject to fouling by the loose material such as weeds and straw on the surface of the soil being worked.

Our invention is embodied in a spring tooth harrow with a supporting frame on wheels so arranged that there is nothing adjacent to or under the tooth carrying bars to catch trash and cause plugging. The frame is so connected to the supporting wheels and to the tooth carrying bars, that the wheels do not cause entanglement of trash with the teeth and the teeth do not entangle trash in the wheels. A minimum of parts are in engagement with the ground where they would be worn by abrasive soil and would increase the power necessary to drag the harrow.

The construction of the frame and the mounting of the wheels and teeth thereon is such that the wheels may readily follow the contour of the ground. Furthermore the wheel mounting and frame construction is such that in soft spots, and hard spots and on side hills, the teeth are always positively controlled as to depth and the implement rests firmly on the wheels and tends to stay up on the side hills.

A further object of our combination of frame and wheel support for the tooth carrying bars is to provide a harrow that will roll around a pivot point in turning corners of a field without tipping, so that several units can be linked together side by side at their front edges and turned without difficulty.

The nature and advantages of our invention will appear more fully from the following description and the accompanying drawings wherein a preferred form of the invention is shown. It should be understood however, that the drawings and description are illustrative only and are not to be considered as limiting the scope of the invention except insofar as it is limited by the claims.

In the drawings:

Figure 1 is a view in side elevation of a spring tooth harrow embodying my invention;

Figure 2 is a plan view of the harrow;

Figure 3 is an enlarged sectional view taken vertically through the frame on the line 3—3 of Figure 1;

Figure 4 is a fragmentary sectional view through one of the end supports for the harrow tooth mounting shafts;

Figure 5 is a fragmentary sectional view illustrating the central mounting of the shafts to the frame of the machine;

Figure 6 is an enlarged sectional view on the line 6—6 of Figure 4;

Figure 7 is a fragmentary sectional view on the line 7—7 of Figure 2; and

Figure 8 is a perspective view of the harrow showing it modified by the addition of a third row of teeth.

Referring now to Figures 1 and 2, these figures illustrate our invention as embodied in a spring tooth harrow. The teeth of the harrow are identified by the numeral 20. They are constructed of flat spring steel bars and formed substantially as shown in Figure 1. These teeth are carried by two hollow shafts 21 and 22 to which they are secured by lower clamping blocks 23 and upper clamping blocks 24. The blocks are clamped on the shafts by bolts 25 and the teeth are secured to the lower blocks 23 by bolts 26. The teeth on the shaft 22 are usually staggered with respect to the teeth on the shaft 21. The teeth can be removed or shifted lengthwise of the shafts by loosening the bolts 25 and sliding the blocks along the shafts without loosening the teeth on the lower block.

A frame 27 fabricated of angle iron and suitable braces, carries the shafts 21 and 22 by means of a series of U-shaped suspension bars 28 having openings in the lower ends of the legs 29 in which the shafts can turn. These bars are removably bolted by bolts 30 and 31 to the frame. The frame comprises two end pieces 32 and 33 and two center pieces 34 and 35 of angle iron offset as indicated at 36 in Figure 1. The offset is formed by cutting a notch in the side flanges and bending the top flange and welding the two sections of the side flange to each other at an angle. Two cross pieces 37 and 38 are bolted to the end pieces and the center pieces. These cross pieces are angle irons too. Another angle iron 39 connects the front ends of the angle irons 32, 33, 34 and 35. Two short pieces 40 and 41 of angle iron are spaced inwardly from the end pieces 32 and 33 and are bolted to the angle irons 37, 38 and 39. Two bracing bars 42 and 43 connect the angle irons 38 and 39 between the pieces 40 and 41. Also two tie rods 44 and 45 are secured to the depending flanges of the angle irons 40 and 41 and passed over a pedestal 46 on the center pieces 34 and 35 and two other tie rods 47 and 48 extend from the front ends of the braces 42 and 43 to the angle irons 40 and 41. This construction provides a very rigid front center section for the frame 27 where the heaviest draft strains occur.

The pieces 32 and 41 mount suitable bearings 49 and 50 for an axle 51 on which a wheel 52 is fixed. Likewise the pieces 33 and 40 mount bearings 53 and 54 for an axle 55 on which a wheel 56 is fixed. As shown best in Figures 1 and 2 these bearings are carried by plates 49*a*, 50*a*, 53*a* and 54*a* that are bolted to the flanges of the angle iron pieces. These plates are long enough to provide two sets of mounting holes so that the axles can be lowered with respect to the frame from the position shown in Figure 1. The extra mounting holes are shown at 49*b* in Figure 1. The wheels 52 and 56 form the front supports for the frame 27. A single rear supporting wheel 57 is provided at the rear ends of the center angle irons 34 and 35. This wheel is journalled upon the lower end of a supporting rod 58. The rod 58 is bent forwardly and then laterally and upwardly to extend through a bearing 59 which is mounted upon a heavy plate 60 that is bolted to the rear ends of the angle irons 34 and 35. A thrust collar 61 is fastened on the rod 58 to bear against the lower surface of the bearing 59. This collar is adjustable vertically to provide a fine adjustment of the depth of the spring teeth. Thus the wheel 57 forms a rear support for the frame at the center. Since the wheel can turn about a vertical axis in the bearing 59 it adjusts itself to turning of the harrow at corners or on curves.

The supports 28 are provided on each of the angle irons 32, 33 and 35 and are suitably braced as indicated at 29*a* on Figures 1 and 7. The shafts 21 and 22 may be turned in the supports 29 by a suitable mechanism to change the elevation of the teeth and thus vary the depth to which they will enter the soil. This mechanism comprises a lever 62 at each end of the frame. They are pivoted at 64 to a bar 65 that is carried by two upstanding arms 66 and 67 the lower ends of which have sleeves 68 and 69 fixed on the ends of the shafts 21 and 22 by bolts 70 and 71. A ratchet segment 73 is provided on the bar 65 and the lever 62 has a spring pawl mechanism 74 for engaging the teeth of the segment to hold the lever in adjusted position. A hand lever 75 is provided for releasing the pawl. The shafts 21 and 22 are divided at the center so that one lever 62 may be operated independently of the other. Figure 5 of the drawings illustrates the manner of connecting the two halves of the hollow shafts. A freely turning stub shaft 63 is carried by the supporting bar 28—29 that is bolted to the center angle irons 34 and 35. The ends of the shaft 21 fit over the stub shaft. Two pins 72 are mounted in the two sections of the shaft 21 to prevent the stub shaft from being displaced.

The modification shown in Figure 8 is substantially like the main form except that three shafts 81, 82 and 83 are provided to carry three rows of teeth 21. Also, extra frame members 84 and 85 are provided and two rear swivelled wheels 86 and 87 are mounted on these members instead of the single rear swivelled wheel 57 in the main form. Three arms 29' are provided on the members 28'. A round cross bar 88 connects the members 84 and 85 to increase the strength of the rear end support.

In utilizing any harrow upon weedy or trashy soil difficulty is encountered because of the accumulation of the trash upon the harrow teeth or upon the lower frame parts that engage the ground. Our wheeled harrow practically avoids this difficulty. The low nose or forward frame piece 39 is at least as low as the wheel axles and the shafts 21 and 22 to give a draft and keep the rear teeth down. The draft exerts a leverage to pull the back end down and keep the rear wheel on the ground in hard ground. The dropped front of the frame also permits the use of a smaller wheel that can be set closer to the teeth in the front row and thus reduce the overall front to back dimension of the machine so it can more readily follow the ground contour in crossing low spots or humps. The teeth do not have adjacent frame members near the curved parts thereof to block the trash from passing between them.

The construction just described has many advantages in operation and use by the farmer. The construction is such that the spacing of the teeth can be varied to suit the individual needs. For example, in weeding it is desirable to have teeth rather closely spaced and set shallow. For working the soil a greater depth is required and it is not necessary to use the teeth so close together. The spacing is easily changed by loosening the bolts that clamp the blocks 23 and 24 to the shafts. The entire tooth assembly can be removed from the frame by removing the bolts 30 and 31 and thus freeing the bars 28 from the frame and removing the end sleeves 69. The depth of the teeth can be set to suit any desired requirement. As shown in Figure 1 the setting of the frame on the wheels is for deep penetration of the teeth. The levers 62 are used to lower the teeth into the soil. The frame can easily be raised on the front wheels by means of the plates 49a, 50a, 53a and 54a and the extra mounting holes provided in these plates. The rear end of the frame is adjusted by raising and lowering the collar 61 on the stem 58 that is carried by the wheel 57. This enables the machine to be set to the right elevation to bring the teeth to the proper angle for penetration of the soil, for the particular work to be done.

The wheeled construction of Figures 1 to 7 is particularly advantageous as constructed. In crossing low spots or valleys in a field or in going lengthwise of the field the fact that the rear wheel is at the center line of the frame and close to the rear teeth, and the setting of the front wheels inwardly substantially from the side edges make it possible for the teeth to reach the lowest ground levels whether the valley be crossed at an angle or be followed.

The fact that the entire framework is clear of the ground is particularly advantageous in the destruction of quack grass and similar weed growths. These weeds are turned over by the teeth and cannot wedge between the teeth and runners as they do in the ordinary runner supported spring tooth harrow. There are no parts sliding on the ground to wear out in gravelly soil. Also when the teeth encounter hard patches of soil like the "hard pan" patches found in this area they stay in the ground much better than the teeth of the ordinary spring tooth harrow.

The harrow teeth can be lifted clear of the ground by the levers for movement across fields where the teeth should not disturb the surface. Also when the machine is to move along a highway it is not necessary to load it on to another vehicle.

The saving in power necessary to pull our improved harrow, when compared to the ordinary spring tooth harrow, is particularly noticeable. The same power unit can pull at least 30% more width of harrow of our type than it can of the usual type. This effects a considerable saving in the working of the soil.

It is believed to be evident, from the foregoing description, that we have provided a novel spring tooth harrow construction wherein the desired objects set forth at the beginning of the specification are accomplished. The particular mounting of the harrow has the advantage of enabling it to follow the ground contour quite closely. Since the only ground engaging parts, other than the teeth, are the wheels, the power necessary to pull the harrow is low. The tendency to clog with trash is also low, and, the variation in depth to which the teeth sink between hard soil and soft soil is kept at a minimum.

While a preferred form of the invention has been shown and described it is evident that many modfications may be made in the several parts within the scope of the invention.

Having described in detail one form of our invention, we claim:

1. A spring toothed harrow comprising a frame having a main horizontal portion and a front portion extending forwardly and downwardly from the main portion, transversely aligned rigid shaft supports fixed to and depending from the main frame portion near the front end thereof, a second row of transversely aligned rigid shaft supports, fixed to and spaced rearwardly from the first named supports and depending from said main frame portion, a shaft pivotally supported by the front shaft supports at their lower ends, a shaft pivotally supported by the rear shaft supports at their lower ends, spring teeth carried by said shafts, means connected to said shafts for locking them against rotation to hold the teeth in soil working position, a rear caster wheel supporting the rear end of the main portion of the frame, said wheel having a supporting stem pivoted in said frame, and two spaced apart front wheels supporting the front portion of said frame, the front portion of said frame comprising a front bar, two outer side frame pieces and a plurality of inner frame pieces fixed to and carrying said front bar and extending upwardly and rearwardly from the front bar to the main frame portion, a cross bar fixed to said frame pieces at their junction with the main frame portion, said front wheels being spaced inwardly from the outer side frame pieces and rearwardly of the front bar of the front portion of said frame.

2. A spring toothed harrow comprising a frame having a main horizontal portion and a front portion extending forwardly and downwardly from the main portion, transversely aligned rigid shaft supports fixed to and depending from the main frame portion near the front end thereof, a second row of transversely aligned rigid shaft supports, fixed to and spaced rearwardly from the first named supports and depending from said main frame portion, a shaft pivotally supported by the front shaft supports at their lower ends, a shaft pivotally supported by the rear shaft supports at their lower ends, spring teeth carried by said shafts, means connected to said shafts for locking them against rotation to hold the teeth in soil working position, said shaft supports comprising suspension bars removably secured to the frame, each having a front leg mounting the front shaft and a rear leg mounting the rear shaft whereby the shafts and teeth may be removed from the frame as a unit, a rear caster wheel supporting the rear end of the main portion of the frame, said wheel having a supporting stem pivoted in said frame, and two spaced apart front wheels supporting the front portion of said frame, the front portion of said frame comprising a front bar, two outer side frame pieces and a plurality of inner frame pieces fixed to and carrying said front bar and extending upwardly and rearwardly from the front bar to the main frame portion, a cross bar fixed to said frame pieces at their junction with the main frame portion, said front wheels being spaced inwardly from the outer side frame pieces and rearwardly of the front bar of the front portion of said frame.

3. A spring toothed harrow comprising in combination a front frame bar, two side frame pieces and a middle frame piece fixed to the front bar and extending rearwardly therefrom, said frame pieces each being bent intermediate its ends to provide a front frame portion rising rearwardly from the front bar and a main frame portion extending horizontally from the front frame portion, a cross bar connecting said pieces at the top rear ends of said front portions, front wheels between the front bar and said cross bar supporting the front frame portion, a trailing caster wheel at the rear of said main frame portion having a vertical supporting stem pivoted to the main frame portion, spring tooth carrying shafts beneath said main frame portion, a suspension bar bolted to each side frame piece and a third suspension bar bolted to the middle frame piece, said bars having depending legs in which the shafts are mounted.

4. A spring toothed harrow comprising in combination a front frame bar, two side frame pieces and a middle frame piece fixed to the front bar and extending rearwardly therefrom, said frame pieces each being bent intermediate its ends to provide a front frame portion rising rearwardly from the front bar and a main frame portion extending horizontally from the front frame portion, shafts beneath said main frame portion, spring teeth fixed to said shafts, suspension members depending from the main frame portion, the shafts being rotatably mounted by said members, means connected to said shafts for locking them against rotation to hold the teeth in soil working position, a cross bar connecting said pieces at the top rear ends of said front portions, front wheels between the front bar and said cross bar supporting the front frame portion, and a trailing caster wheel at the rear of said main frame portion having a vertical supporting stem pivoted to the main frame portion.

References Cited in the file of this patent

UNITED STATES PATENTS

| Number | Name | Date |
| --- | --- | --- |
| 586,737 | Guerne | July 20, 1897 |
| 604,289 | Babcock | May 17, 1898 |
| 636,371 | Whipple | Nov. 7, 1899 |
| 636,477 | Whipple | Nov. 7, 1899 |
| 1,899,306 | Botnen | Feb. 28, 1933 |

FOREIGN PATENTS

| Number | Country | Date |
| --- | --- | --- |
| 743,677 | France | Jan. 16, 1933 |